United States Patent
Teagle et al.

(10) Patent No.: US 9,048,494 B2
(45) Date of Patent: Jun. 2, 2015

(54) ELECTROLYTIC MANGANESE DIOXIDE IMPROVED FOR TOOL WEAR REDUCTION

(75) Inventors: John A. Teagle, Queen Anne, MD (US); Oliver Schilling, Severna Park, MD (US)

(73) Assignee: ERACHEM COMILOG, INC., Baltimore, MD (US)

( * ) Notice: Subject to any disclaimer, the term of this patent is extended or adjusted under 35 U.S.C. 154(b) by 846 days.

(21) Appl. No.: 13/192,936

(22) Filed: Jul. 28, 2011

(65) Prior Publication Data

US 2012/0034530 A1 Feb. 9, 2012

Related U.S. Application Data

(60) Provisional application No. 61/370,131, filed on Aug. 3, 2010.

(51) Int. Cl.

| | | |
|---|---|---|
| *H01M 4/50* | (2010.01) | |
| *H01M 6/04* | (2006.01) | |
| *H01M 4/62* | (2006.01) | |
| *H01M 4/38* | (2006.01) | |
| *H01M 4/42* | (2006.01) | |

(52) U.S. Cl.
CPC ............... *H01M 4/50* (2013.01); *H01M 4/382* (2013.01); *H01M 4/42* (2013.01); *H01M 4/628* (2013.01); *H01M 6/04* (2013.01); *H01M 2300/0002* (2013.01)

(58) Field of Classification Search
CPC ......... H01M 4/628; H01M 4/50; H01M 6/04; H01M 6/045
USPC ............................ 429/224, 231.95; 252/182.1
See application file for complete search history.

(56) References Cited

U.S. PATENT DOCUMENTS

| 4,338,209 A | 7/1982 | Manabe et al. | |
|---|---|---|---|
| 4,465,747 A * | 8/1984 | Evans | 429/224 |

(Continued)

FOREIGN PATENT DOCUMENTS

| WO | WO 0171831 A2 * | 9/2001 | ............. H01M 4/00 |

OTHER PUBLICATIONS

"Lithium benzoate". ChemSpider. Royal Chemical Society. Web. Sep. 26, 2014. <http://www.chemspider.com/Chemical-Structure.10642.html?rid=ac2922ce-9886-4756-aa77-81809ec15b19>.*

*Primary Examiner* — Edu E Enin-Okut
(74) *Attorney, Agent, or Firm* — Squire Patton Boggs (US) LLP

(57) ABSTRACT

An electrolytic manganese dioxide improved for tool wear reduction, methods for preparing the improved electrolytic manganese dioxide and for preparing a positive-electrode precursor, and a primary battery are provided. One method includes displacement-washing neutralized electrolytic manganese dioxide with a solution including a corrosion inhibitor configured to be at a first predetermined concentration. The method further includes drying the washed electrolytic manganese dioxide to collect improved electrolytic manganese dioxide including the corrosion inhibitor configured to be at a second predetermined concentration within the improved electrolytic manganese dioxide to minimize corrosion of a metal material in contact with the improved electrolytic manganese dioxide. The corrosion inhibitor includes one of a benzoate salt, a phosphate salt, a carbonate salt, a metaborate salt, a tetraborate salt, a metaperiodate salt, and a meta-aluminate salt.

6 Claims, 9 Drawing Sheets

(56) References Cited

U.S. PATENT DOCUMENTS

| | | | |
|---|---|---|---|
| 4,959,282 A * | 9/1990 | Dahn et al. | 429/224 |
| 5,863,675 A * | 1/1999 | Capparella et al. | 429/224 |
| 6,022,641 A * | 2/2000 | Endo et al. | 429/232 |
| 6,596,438 B2 * | 7/2003 | Zeng | 429/232 |

* cited by examiner

ELECTROLYTIC MANGANESE DIOXIDE IMPROVED FOR TOOL WEAR REDUCTION

CROSS REFERENCE TO RELATED APPLICATIONS

This is a non-provisional application claiming priority under 35 U.S.C. §119(e) from U.S. Provisional Patent Application Ser. No. 61/370,131, filed on Aug. 3, 2010. The subject matter of this earlier filed application is hereby incorporated by reference.

BACKGROUND

1. Field

Embodiments of the invention relate to electrolytic manganese dioxide (EMD), which has been improved so that, when it comes in contact with a metal material, corrosion of the metal material is reduced when compared to contact with conventional EMD. Moreover, certain embodiments of the invention are directed to methods for producing the improved EMD by applying a corrosion inhibitor to a neutralized EMD such that corrosion of a metal material arising from contact with the improved EMD is reduced. Furthermore, the invention relates to batteries including the improved EMD.

2. Description of the Related Art

EMD is commonly used as an active material for dry battery cells because it is an inexpensive and abundant material and it provides excellent discharge and long-term storage performance. For example, EMD is used as a material in the positive electrode of a primary alkaline or lithium battery or as a precursor for an active material of a positive electrode in a lithium-ion battery.

EMD is typically prepared by passing a direct current through an acidic solution of manganese sulfate and sulfuric acid. The positive electrode of this plating may include a plate of titanium onto which the EMD is deposited. The negative electrode may be made of graphite or copper, or similar material. The deposited EMD is mechanically removed from the titanium plate after it has reached a thickness of about 1 mm to about 75 mm. EMD pieces removed from the titanium plate are reduced in size to meet the requirements of the battery manufacturer using a grinding or milling process. The resulting material is referred to as milled EMD.

Because the EMD is prepared in an acidic bath, the preparation of the EMD generally requires a washing and/or caustic treatment of the EMD to neutralize the acidity of the bath. This treatment may be performed before or after the milling of the EMD. The resulting material after this neutralization step is referred to as neutralized EMD.

In a final step, the EMD is dried to certain specifications. For example, for primary alkaline-battery applications, the drying step is generally mild, leaving behind the chemically bound water and physisorbed water, which may range from about 1% to about 3% of the product weight. The resulting material is the active material for primary alkaline batteries.

For primary-lithium-battery applications, the active material is prepared by removing all water, whether chemical or physisorbed, to avoid any reaction with the organic electrolyte and/or the metallic lithium in the battery.

Because the EMD is prepared in a solution of manganese sulfate or sulfuric acid, there is a high concentration of sulfate associated with the material, typically 1-1.4% by weight of the material, after drying. Without being bound by corrosion mechanisms, sulfate is a known corrosion aggressor ion that will facilitate or promote the corrosion of iron found in a steel piece.

Battery manufacturers use the EMD as an active material of the positive electrode in alkaline cells against a zinc anode. The EMD is combined with other materials that make up the positive-electrode precursor, which is compacted by tools, frequently made from a metal material such as steel, before or during insertion of the mix into metal cans. These cans form the housing for batteries and at the same time act as the current collectors for the positive electrode. Because various parts of the production line involve metal tools, for example, tools made from steel that are in direct contact with the EMD, there is a risk of accelerated corrosion which leads to increased tool wear beyond normal expected mechanical wear. A particular concern is the dies and pins that are used to form hollow cylinders from the positive-electrode precursor. These cylinders are formed under high pressure, which reduces the useful life of the dies and pins caused by mechanical wear. If these parts are made of steel, sulfate may accelerate the corrosion of the steel, and then by erosion hasten the tool wear of these parts, shortening the life of the steel parts.

The current collectors for the positive electrode used by battery manufacturers are typically made from steel which is nickel coated on the surface in contact with the positive electrode. If this nickel coating is compromised during its formation, worn, scratched or too thin, the sulfate may initiate corrosion on the contact surface. Corrosion on the current collector in the battery has the potential of adversely affecting battery performance.

SUMMARY

In accordance with an embodiment of the invention, there is provided an EMD including a corrosion inhibitor configured to be at a predetermined concentration within the EMD to minimize corrosion of a metal material in contact with the EMD.

In accordance with another embodiment of the invention, there is provided a method for improving EMD, which includes displacement-washing neutralized EMD with a solution including a corrosion inhibitor configured to be at a first predetermined concentration. The method further includes drying the washed EMD to collect improved EMD including the corrosion inhibitor configured to be at a second predetermined concentration within the EMD to minimize corrosion of a metal material in contact with the improved EMD.

In accordance with another embodiment of the invention, there is provided a method for improving EMD, which includes suspending EMD in an aqueous solution including a corrosion inhibitor configured to be at a first predetermined concentration, and agitating the EMD in the aqueous solution for a predetermined period of time. The corrosion inhibitor includes one of a benzoate salt, a phosphate salt, a carbonate salt, a metaborate salt, a tetraborate salt, a metaperiodate salt, and a meta-aluminate salt. The method further includes filtering and drying the agitated EMD to collect improved EMD. When the agitated electrolytic manganese dioxide is filtered and dried, the improved EMD includes the corrosion inhibitor having a second predetermined concentration within the EMD to minimize corrosion of a metal material in contact with the improved EMD.

In accordance with another embodiment of the invention, there is provided a method for producing a positive-electrode precursor, which includes mixing EMD with a corrosion inhibitor to form a homogeneous composition. The corrosion inhibitor includes one of a benzoate salt, a phosphate salt, a carbonate salt, a metaborate salt, a tetraborate salt, a metaperiodate salt, and a meta-aluminate salt. The method further includes, after mixing, granulating the homogenous composition or reducing moisture in the homogenous composition. The positive-electrode precursor includes the corrosion inhibitor configured to be at a predetermined concentration within the positive-electrode precursor to minimize corrosion of a metal material in contact with the positive-electrode precursor.

In accordance with another embodiment of the invention, there is provided a battery, which includes a negative electrode, an electrolyte, a positive electrode, and a metal current collector for the positive electrode in contact with the positive electrode. The positive electrode includes a mixture of EMD and a corrosion inhibitor. The corrosion inhibitor is configured to be at a predetermined weight ratio with respect to the EMD to minimize corrosion of the metal current collector in contact with the positive electrode. In accordance with another embodiment of the invention, there is provided a battery, which includes a negative electrode, an electrolyte, a positive electrode, and a metal current collector for the positive electrode in contact with the positive electrode. The positive electrode includes an EMD including a corrosion inhibitor configured to be at a predetermined concentration within the EMD to minimize corrosion of a metal current collector in contact with the positive electrode.

BRIEF DESCRIPTION OF DRAWINGS

Further aspects, details, advantages and modifications of the invention will become apparent from the following detailed description of the embodiments, which is to be taken in conjunction with the accompanying drawings, in which.

DETAILED DESCRIPTION

It will be readily understood that the components of the invention, as generally described and illustrated in the figures herein, may be arranged and designed in a wide variety of different configurations. Thus, the following detailed description of the embodiments of the improved EMD, the methods for preparing the improved EMD, and the battery containing the improved EMD, as represented in the attached figures, is not intended to limit the scope of the invention as claimed, but is merely representative of selected embodiments of the invention.

Figure 1:
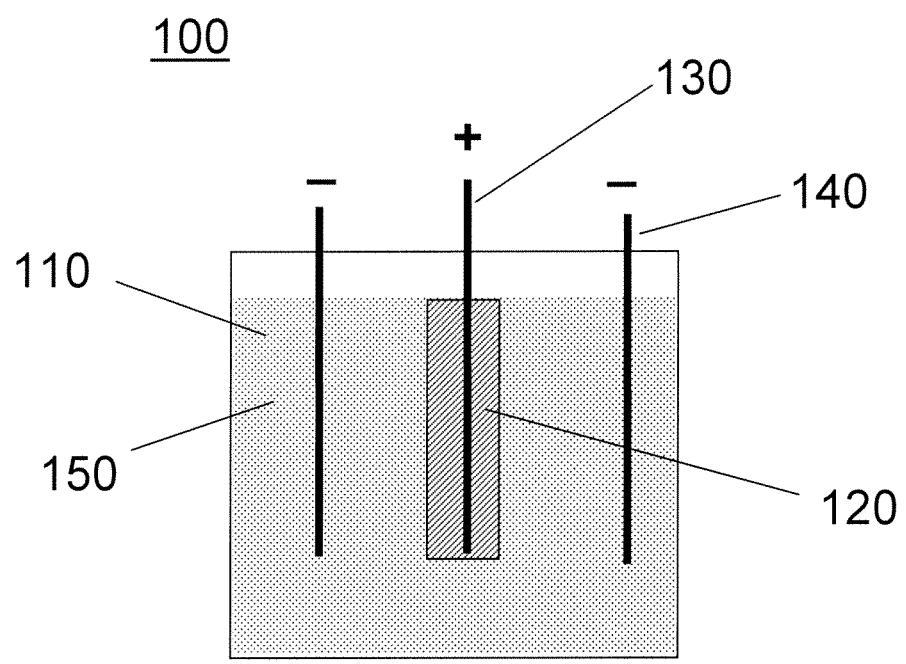
FIG. 1 shows a schematic diagram of a conventional EMD electrolysis cell.

FIG. 1 shows a schematic diagram of a conventional EMD electrolysis cell. With reference to FIG. 1, EMD is prepared from a high-purity manganese sulfate solution 110. This solution is passed into an electrolytic cell 100, where EMD chip 120 is deposited on the positive electrode 130, which is made of, for example, titanium. Hydrogen is evolved at the negative electrode 140, which is made of, for example, copper. An electrolysis process is performed using the conventional EMD electrolysis cell to generate sulfuric acid 150, which is typically removed from the electrolytic cell 100, for example, by overflow.

Figure 2:
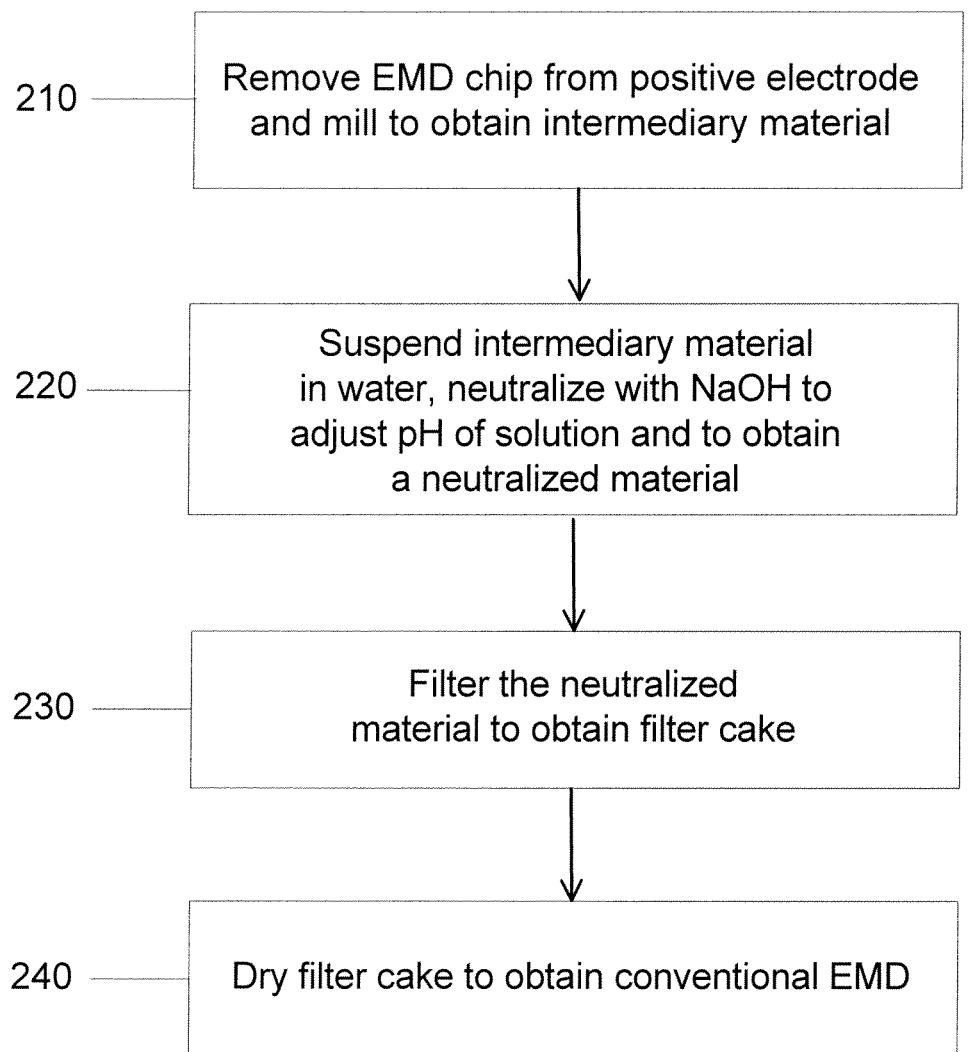
FIG. 2 shows a flow diagram of a conventional method for preparing EMD.

FIG. 2 shows a flow diagram of a conventional method for preparing EMD. In step 210, the EMD chip 120 is removed from the positive electrode 130 of the electrolytic cell 100, and milled to obtain an intermediary material. In step 220, this intermediary material is suspended in water and neutralized with sodium hydroxide to a predetermined pH to form a neutralized material. The neutralized material is then filtered, at step 230, to obtain a filter cake. The filter cake is collected and subsequently dried, at step 240, for example by hot air, to obtain conventional EMD.

Figure 3:
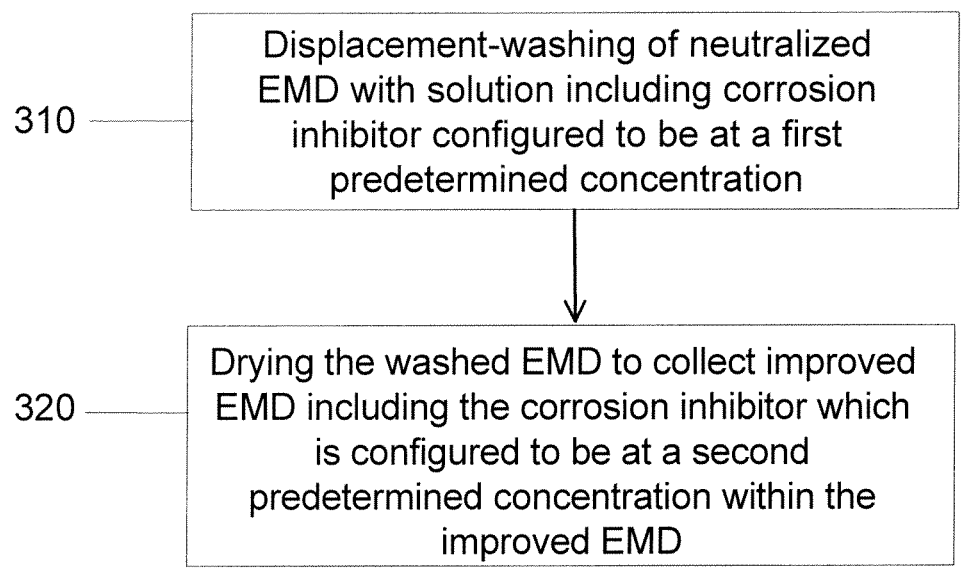
FIG. 3 shows a flow diagram of a method for improving EMD, in accordance with an embodiment of the invention.

FIG. 3 shows a flow diagram of a method for preparing improved EMD, in accordance with an embodiment of the invention. The method includes displacement-washing, at step 310, neutralized EMD, for example, the filter cake discussed above for FIG. 2, with a solution including a corrosion inhibitor configured to be at a first predetermined concentration. The method further includes drying, at step 320, the washed EMD to collect improved EMD including the corrosion inhibitor which is configured to be at a second predetermined concentration within the improved EMD to minimize corrosion of a metal material in contact with the improved EMD.

In accordance with an embodiment of the invention, the displacement-washing includes spraying a dissolved corrosion inhibitor on the neutralized EMD. Displacement-washing includes moving residual moisture of neutralized EMD, for example, a filter cake, to a discharge of filtration equipment and replacing the residual moisture with a wash solution. For example, if a filter cake of about 1 kg weight contains about 15% moisture, then displacement-washing may include adding at least 0.15 kg of wash solution to the filter cake, which percolates through the cake and displaces the existing residual moisture. In accordance with an embodiment of the invention, an excess amount of wash solution may be needed to effectively displace all the existing residual moisture in the filter cake. The filter cake is then collected and subsequently dried to produce an improved EMD which includes a corrosion inhibitor having a second predetermined concentration within the improved EMD to minimize corrosion of a metal material which may come into contact with the improved EMD.

Figure 4:
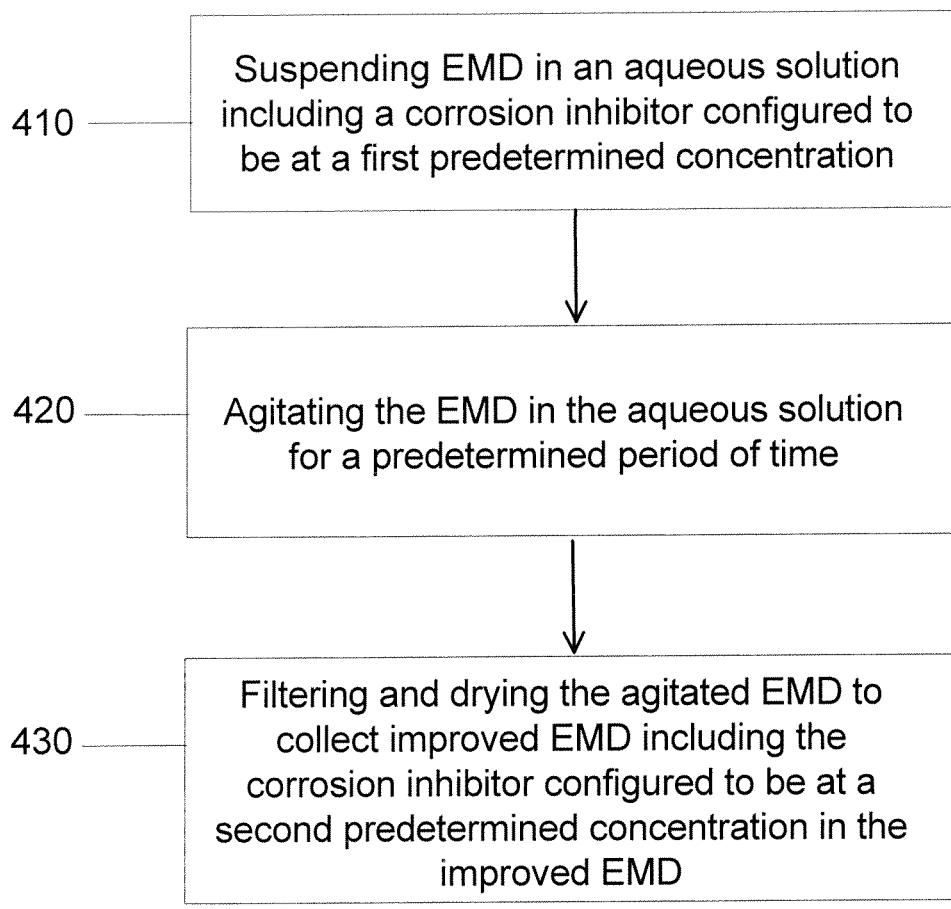
FIG. 4 shows a flow diagram of another method for improving EMD, in accordance with an embodiment of the invention.

FIG. 4 shows a flow diagram of another method for preparing improved EMD, in accordance with an embodiment of the invention. As shown in FIG. 4, the method includes suspending, at step 410, EMD in an aqueous solution including a corrosion inhibitor configured to be at a first predetermined concentration, and agitating, at step 420, the EMD in the aqueous solution for a predetermined period of time. The aqueous solution may include water. The method further includes filtering and drying, at step 430, the agitated EMD to collect improved EMD. When the agitated electrolytic manganese dioxide is filtered and dried, the improved EMD includes a corrosion inhibitor configured to be at a second predetermined concentration within the EMD to minimize corrosion of a metal material in contact with the improved EMD.

In accordance with an embodiment of the invention, suspending the EMD may occur after milling the EMD. The agitating includes agitating the EMD in the aqueous solution for at least one hour.

Figure 5:
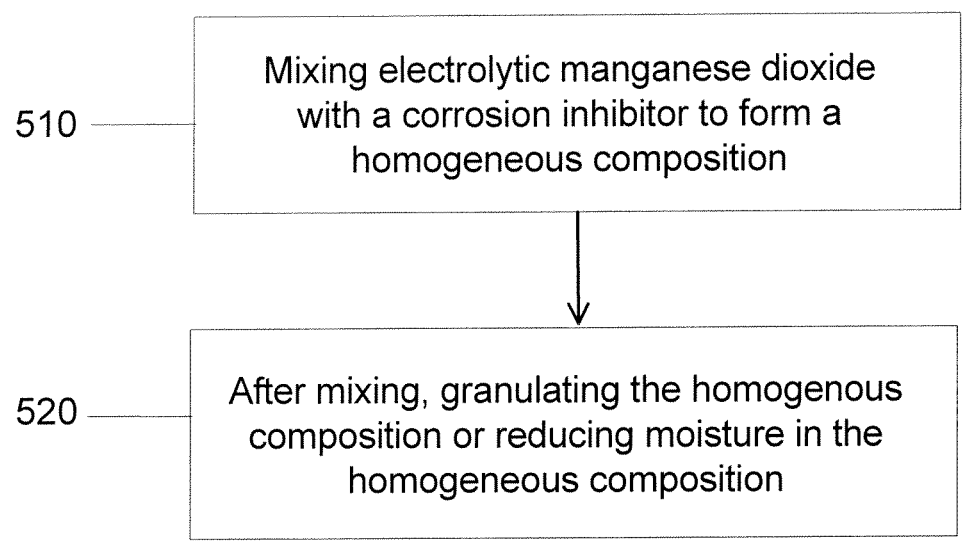
FIG. 5 shows a flow diagram of a method for producing a positive-electrode precursor, in accordance with an embodiment of the invention.

FIG. 5 shows a flow diagram of a method for producing a positive-electrode precursor, in accordance with an embodiment of the invention. The method includes, at step 510, mixing electrolytic manganese dioxide with a corrosion inhibitor to form a homogeneous composition. The corrosion inhibitor includes one of, for example, a benzoate salt, a phosphate salt, a carbonate salt, a metaborate salt, a tetraborate salt, a metaperiodate salt, and a meta-aluminate salt. The method further includes, at step 520, after mixing, granulating the homogenous composition or reducing moisture in the homogenous composition. The positive-electrode precursor includes the corrosion inhibitor configured to be at a predetermined concentration within the positive electrode precursor to minimize corrosion of a metal material in contact with the positive-electrode precursor.

In accordance with an embodiment of the invention, the mixing includes mechanically mixing the electrolytic manganese dioxide with the corrosion inhibitor to form the homogenous solution.

For the method described above for FIG. 4, the concentration of the corrosion inhibitor in the aqueous solution (i.e., the first predetermined concentration) may be correlated to the concentration of the corrosion inhibitor within the resulting, improved EMD (i.e., the second predetermined concentration) by a regression analysis. An $R^2$ value of 0.98 may be obtained.

For each of the methods described above for FIGS. 3-5, the corrosion inhibitor may include one of, for example, a benzoate salt, a phosphate salt, a carbonate salt, a metaborate salt, a tetraborate salt, a metaperiodate salt, and a meta-aluminate salt. The carbonate salt may include sodium hydrogen carbonate. The metaborate salt may include lithium metaborate. The tetraborate salt may be lithium tetraborate. The metaperiodate salt may include potassium metaperiodate. The meta-aluminate salt may include sodium meta-aluminate.

The corrosion inhibitor may further include a benzoate anion, which is associated with a cation including one of sodium and potassium. Further, the corrosion inhibitor may include a phosphate anion, which is associated with a cation including one of sodium, potassium, or hydrogen.

The corrosion inhibitor may include benzoate configured to be at a concentration greater than about 295 parts per million (ppm) relative to the weight of the EMD. Alternatively, a carbon concentration in the EMD due to the benzoate is greater than about 200 ppm. In another embodiment of the invention, the corrosion inhibitor may include benzoate at a concentration of greater than about 610 ppm relative to the weight of the EMD. Alternatively, the carbon concentration in the EMD due to the benzoate is greater than about 425 ppm.

Figure 6:
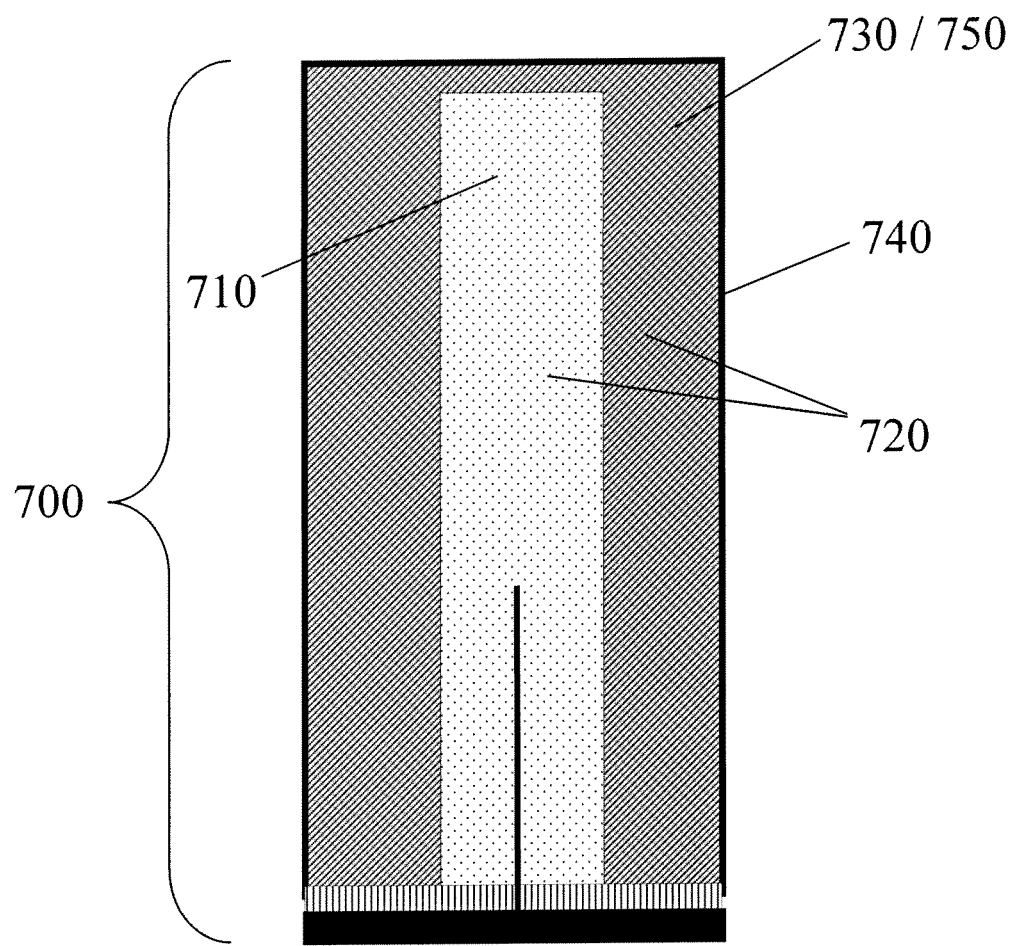
FIG. 6 shows an improved EMD including a corrosion inhibitor, in accordance with an embodiment of the invention.

FIG. 6 shows an improved EMD including a corrosion inhibitor, in accordance with an embodiment of the invention. The improved EMD 610 includes a corrosion inhibitor 620, configured to be at a predetermined concentration within the improved EMD 610 to minimize corrosion of a metal material in contact with the improved EMD 610.

Figure 7:
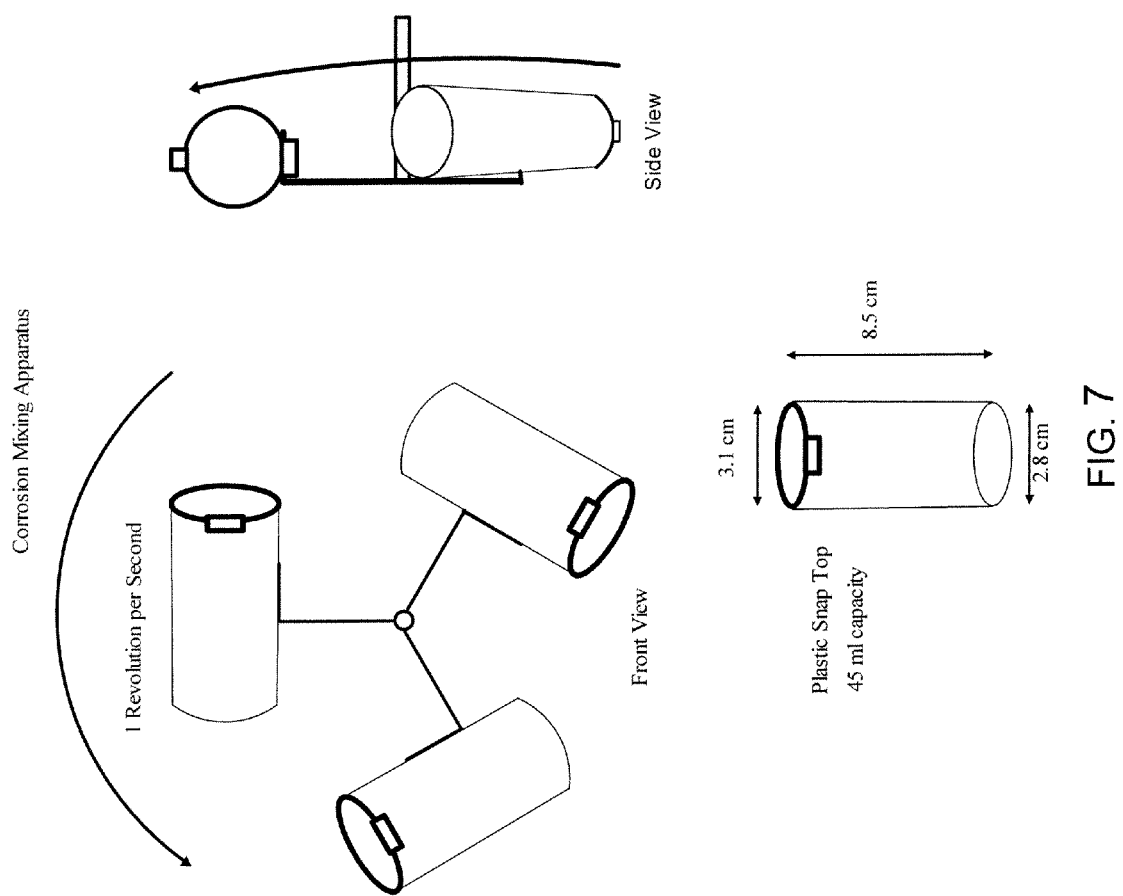
FIG. 7 shows a schematic diagram of a primary battery, in accordance with an embodiment of the invention.

FIG. 7 shows a schematic diagram of a primary battery 700, in accordance with an embodiment of the invention. The primary battery 700 includes a negative electrode 710, an electrolyte 720, a positive electrode 730, and a metal current collector 740 for the positive electrode 730 in contact with the positive electrode 730. The positive electrode 730 includes an EMD 750 including a corrosion inhibitor configured to be at a predetermined concentration within the EMD 750 to minimize corrosion of a metal material in contact with the EMD 750, for example, of the metal current collector 740. The metal current collector 740 for the positive electrode 730 is in contact with the positive electrode 730.

In accordance with an embodiment of the invention, the primary battery 700 includes an alkaline battery or a lithium battery. When the primary battery 700 is an alkaline battery, the negative electrode 710 includes zinc, and the electrolyte 720 includes potassium hydroxide. When the primary battery 700 is an alkaline battery, the EMD 750 is mixed with other materials, for example, graphite and a solution of potassium hydroxide to form the positive-electrode precursor. The positive-electrode precursor is shaped into compacts, for example, hollow cylinders by presses using tools, for example, steel tools. These tools may be subject to a corrosive attack, for example, by the sulfate contained in the EMD 750. It is therefore desirable for the positive-electrode precursor to include an improved EMD according to an embodiment of the invention.

Compacts formed from the positive electrode precursor may then be made into a positive electrode 730 of the primary battery 700, for example, by inserting hollow cylinders into a cylindrical can.

In accordance with another embodiment, the electrolytic manganese dioxide is heated before use on the positive electrode 730.

In accordance with another embodiment of the invention, the negative 710 electrode includes a lithium metal and the electrolyte 720 includes a lithium-containing organic solvent. The corrosion inhibitor may include a benzoate concentration greater than 295 parts per million relative to a weight of the electrolytic manganese dioxide.

Examples 1-22 demonstrate that the corrosivity of EMD can be reduced by displacement washing the EMD, for example Erachem Comilog K60 EMD, using a solution or by suspending the EMD in an aqueous solution, where both the solution and the aqueous solution include a benzoate salt or phosphate salt, or other corrosion inhibitor. As previously described, the concentration of the corrosion inhibitor in the aqueous solution can be correlated to the concentration of the corrosion inhibitor within the improved EMD by a regression analysis. An $R^2$ value of 0.98 may be obtained.

Determining the predetermined concentration of the corrosion inhibitor in the solution or aqueous solution alone is not sufficient for ongoing production purposes. It is quite necessary to conduct quality assurance sampling and measurements of the concentration of the corrosion inhibitor within the EMD.

The type of quality-assurance method is based on the type of corrosion inhibitor used. As previously described, the corrosion inhibitors, in accordance with embodiments of the invention, may include one of, for example, a benzoate salt, a phosphate salt, a carbonate salt, a metaborate salt, a tetraborate, metaperiodate salt, and a meta-aluminate salt. Each of these corrosion inhibitors includes chemical elements that are foreign to conventional EMD.

An analysis using inductively-coupled plasma atomic emission spectroscopy (ICP-AES), for example, an ICP-AES manufactured by Horiba, may be suitable for assuring the predetermined concentration of some of the corrosion inhibitors. For example, the concentration of lithium metaborate can be determined by dissolving 1.8 g of EMD in 100 ml of an acid, such as nitric acid, at a strength of about 5% with the aid of hydrogen peroxide as a reducing agent. The resulting solution will then be analyzed by the ICP-AES for its boron and lithium content. To obtain an accurate reading of the amount of boron and lithium in the resulting solution due to the corrosion inhibitor, a baseline reading should be obtained on a product that does not include any corrosion inhibitor.

Similarly, ICP-AES can be used to determine the aluminum level due to use of sodium meta-aluminate, or to determine the phosphorous level due to the use of a phosphate salt. Because sodium may be used during the neutralization of EMD, it cannot be used for the determination of the corrosion inhibitor concentration.

In order to determine the concentration of sodium hydrogen carbonate, a different analysis method is needed. For example, a carbon analyzer may be used to measure the carbon content in the improved EMD due to the corrosion inhibitor. As previously noted, a baseline reading should be obtained on a product that does not include any corrosion inhibitor.

Similarly, the benzoate concentration can be determined by carbon analysis because the benzoate ion is made up of seven carbon atoms.

The technique for determining the benzoate concentration by carbon analysis may fail, however, if carbon is introduced into the sample from other sources, such as the graphite found in the positive electrode of an alkaline battery. Therefore, a direct measurement of benzoate is needed. The benzoate concentration can be determined with the use of a standard soxhlet extraction procedure following a cryogenic grinding to extract the benzoate from the EMD surface. High-performance liquid chromatography mass spectroscopy with ultraviolet detection (HPLC-UV) can then be used, for example, to quantify the concentration of the benzoate within the soxhlet extraction solvent. This technique can also be used to determine the benzoate concentration in the presence of potassium hydroxide, which is part of an alkaline battery.

In each of Examples 1-22, the use of an EMD including a corrosion inhibitor configured to be at a predetermined concentration within the EMD to minimize corrosion of a metal material in contact with the EMD is demonstrated or its preparation is described. Methods are described for the preparation of the EMD according to the invention, which include suspending powder in a corrosion-inhibitor-containing solution or displacement-washing a filter cake with an aqueous solution of a corrosion inhibitor. The corrosion inhibitor may include one of, for example, a benzoate salt, a phosphate salt, sodium hydrogen carbonate salt, lithium metaborate salt, lithium tetraborate salt, potassium metaperiodate salt, and sodium meta-aluminate salt. Each solution is stirred for a predetermined period of time so that all the particles in the solution are adequately dispersed. Improved EMD is collected on a filter and dried in an oven. A four day corrosion test, which includes contacting one or more steel ball bearings with the improved EMD, is performed using a corrosion mixing apparatus for each experiment to demonstrate the efficacy of benzoate and phosphate as corrosion inhibitors as will be discussed in more detail below.

Example 1

20 grams of neutralized EMD powder was suspended in an aqueous solution of 500 milliliters of condensate water containing 1.5 grams of sodium benzoate. The suspension was stirred for one hour with adequate dispersion to keep all particles suspended. After one hour, powder was collected on a filter and dried in an oven. The resulting EMD included a concentration of sodium benzoate of about 1142 parts per million within the EMD.

Example 2

A suspension similar to that described in Example 1 was prepared, however the condensate water contained 1.0 grams of sodium benzoate. The resulting EMD included a concentration of sodium benzoate of about 773 parts per million within the EMD.

Example 3

A suspension similar to that described in Example 1 was prepared, however the condensate water contained 0.5 grams of sodium benzoate. The resulting EMD included a concentration of sodium benzoate of about 377 parts per million within the EMD.

Example 4

A suspension similar to that described in Example 1 was prepared, however the condensate water contained 0.25 grams of sodium benzoate. The resulting EMD included a concentration of sodium benzoate of about 324 parts per million within the EMD.

Example 5

A suspension similar to that described in Example 1 was prepared, however the condensate water contained 0.125 grams of sodium benzoate. The resulting EMD included a concentration of sodium benzoate of less than 83 parts per million within the EMD.

Examples 1-5 demonstrate that a corrosion inhibitor, for example, sodium benzoate, can be incorporated within the EMD at a predetermined concentration. Correlation analysis between the amount of sodium benzoate added to the condensate water and the resulting concentration within the EMD show a regression analysis $R^2$ value of about 0.98, which indicates a high predictability.

Example 6

Figure 8:
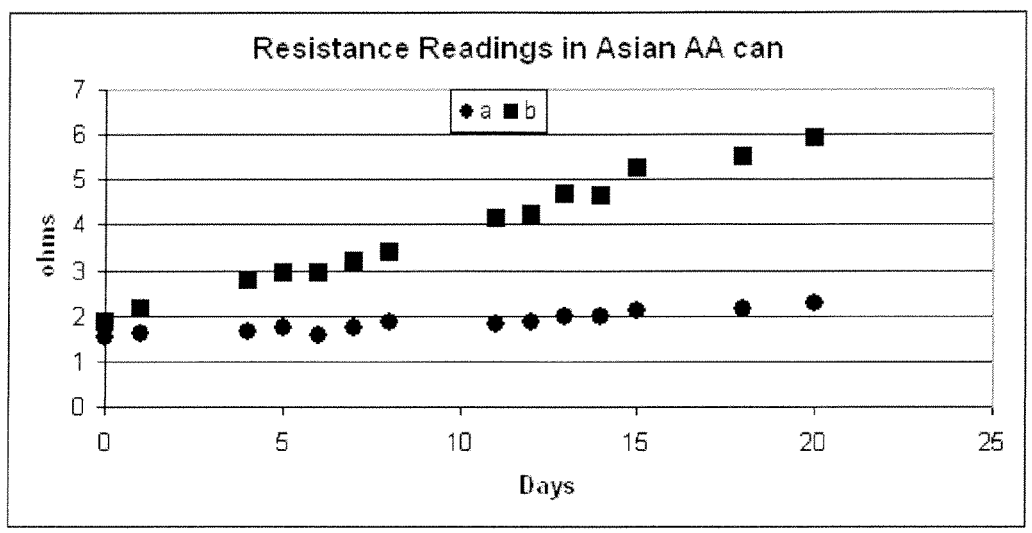
FIG. 8 corrosion-test mixing apparatus used in a four day corrosion test, in accordance with an embodiment of the invention.

The EMD obtained in Example 1 was subjected to the following 4-day corrosion test:

Weigh 18.0 g of EMD powder and place the EMD powder in a 45 ml snap top plastic container. Using a pipette, add 0.40 g of distilled $H_2O$ to the EMD powder. Use a spatula to stir and homogenize the EMD powder and $H_2O$ mixture. Add two 11 mm steel ball bearings (Salem Ball Co., part number 577) to the EMD mixture and seal the plastic container. Mount a variable-speed mixer so that the shaft of mixer is arranged in a horizontal orientation. Attach a three-blade paddle to the bottom of the shaft. Attach the 45 ml snap top plastic container to the flat blade on the variable mixer using a rubber band (see FIG. 8). Turn the mixer on and adjust the speed of the mixer so that the samples revolve once every second. Mix for 5 hours. Collect the sample and then tap the plastic container on the countertop to pack down and ensure that the EMD contacts the steel ball bearings. Verify that the steel ball bearings are completely buried in the mixture. Store the container for 4 days with the snap lid tightly secured. After 4 days, collect the steel ball bearings and use a cloth to wipe off excess EMD from the surface of the steel ball bearings. Visually estimate the severity of corrosion on the steel ball bearings. After four days, the steel ball bearings were found to be free of any corrosion.

Examples 7 to 10

The EMDs obtained in Examples 2-5 were subjected to the 4-day corrosion test using the process described above in Example 6. The results are summarized in Table 1.

Comparative Example 1

EMD that does not include any corrosion inhibitor was prepared according to the method described in FIG. 2 and was then subjected to the 4-day corrosion test, using the process described above in Example 6. After four days, the steel ball bearings were found to be covered with corrosion.

TABLE 1

| EMD from | Sodium Benzoate Content (ppm) | Equivalent Carbon content (ppm) | 4-day Corrosion Test Result |
| --- | --- | --- | --- |
| Comparative Example 1 | 0 | 0 | Severe Corrosion |
| Example 5 | <83 | <48 | Modest Corrosion |
| Example 4 | 324 | 189 | Light Corrosion |
| Example 3 | 377 | 220 | Trace Corrosion |
| Example 2 | 773 | 451 | No corrosion |
| Example 1 | 1142 | 666 | No corrosion |

In each of Examples 1 to 5, an EMD including a corrosion inhibitor, namely sodium benzoate, having a predetermined concentration within the EMD was prepared. Examples 6-10, particularly in context with Comparative Example 1, demonstrate that small concentrations of sodium benzoate will reduce corrosion, while concentrations larger than about 350 ppm leave only light corrosion, and concentrations larger than about 725 ppm leave only traces or no corrosion on the ball bearings. Alternatively, a carbon content of larger than about 200 ppm due to benzoate leaves only a trace of corrosion, and a carbon content of larger than about 425 ppm due to benzoate shows no corrosion remaining on the ball bearings.

Examples 11-17 demonstrate that the choice of corrosion inhibitor is not limited to the sodium benzoate of Examples 1-10. The corrosion inhibitor may include, but is not limited to, sodium hydrogen carbonate ($NaHCO_3$), lithium metaborate ($LiBO_2$), lithium tetraborate ($Li_2B_4O_7$), potassium metaperiodate ($KIO_4$), sodium meta-aluminate ($NaAlO_2$), disodium hydrogen phosphate ($Na_2HPO_4$, CAS number 7558-79-4), or sodium dihydrogen phosphate ($NaH_2PO_4$, CAS number 10049-21-5).

Example 11

A suspension similar to that described in Example 1 was prepared, however the condensate water contained 1.0 grams of $NaHCO_3$. The resulting EMD was subjected to the 4-day corrosion test. After four days, the steel ball bearings were found to be free of any corrosion.

Example 12

A suspension similar to that described in Example 1 was prepared, however the condensate water contained 1.0 grams of $LiBO_2$. The resulting EMD was subjected to the 4-day corrosion test. After four days, the steel ball bearings were found to be free of any corrosion.

Example 13

A suspension similar to that described in Example 1 was prepared, however the condensate water contained 1.0 grams of $Li_2B_4O_7$. The resulting EMD was subjected to the 4-day corrosion test. After four days, the steel ball bearings were found to be free of any corrosion.

Example 14

A suspension similar to that described in Example 1 was prepared, however the condensate water contained 1.0 grams of $KIO_4$. The resulting EMD was subjected to the 4-day corrosion test. After four days, the steel ball bearings were found to be free of any corrosion.

Example 15

A suspension similar to that described in Example 1 was prepared, however the condensate water contained 1.0 grams of $NaAlO_2$. The resulting EMD was subjected to the 4-day corrosion test. After four days, the steel ball bearings were found to be free of any corrosion.

Example 16

A suspension similar to that described in Example 1 was prepared, however the condensate water contained 1.0 grams of $Na_2HPO_4$, CAS number 7558-79-4). The resulting EMD was subjected to the 4-day corrosion test. After four days, the steel ball bearings were found to be free of any corrosion.

Example 17

A suspension similar to that described in Example 1 was prepared, however the condensate water contained 1.0 grams of $NaH_2PO_4$. The resulting EMD was subjected to the 4-day corrosion test. After four days, the steel ball bearings were found to have a few corrosion spots.

Example 18 shows another process for demonstrating the efficacy of the improved EMD including a corrosion inhibitor on a compromised nickel-coated battery button.

Example 18

A cross-shaped pattern was scratched in the bottom of a 12 millimeter nickel-coated battery button can to compromise the nickel-coating on the can. The can was then buried in the EMD of Example 2 for four days (i.e., applying the 4-day corrosion test). After four days, the can was found to be free of any corrosion.

Comparative Example 2

A cross-shaped pattern was scratched in the bottom of a 12 millimeter nickel-coated battery button can to compromise the nickel-coating on the can. The can was then buried for four days in conventional EMD (i.e., that does not include any corrosion inhibitor; this EMD was prepared according to the method described in FIG. 2). After four days, the can was found to be corroded where the nickel coating was compromised due to the scratch.

Example 18 in context with Comparative Example 2 demonstrates the advantage of the improved EMD prepared using methods in accordance with certain embodiments of the invention. Battery cans, which form the housing of batteries or the current collector for a positive electrode, typically come into intimate contact with the positive electrode, which may include EMD. These battery cans may be subject to manufacturing variation or anomalous processing situations that may compromise their protective nickel coating. Examples 1-18 demonstrate the efficacy of corrosion inhibitors having a predetermined concentration within the improved EMD, in accordance with an embodiment of the invention, for preventing corrosion in these compromised regions of the battery cans and for maintaining battery performance.

Example 19

45 kilograms of neutralized EMD powder was suspended in an aqueous solution of 2.25 kilograms of sodium benzoate in 300 gallons of condensate water, which is similar to the solution concentration of Example 2. The suspension was stirred for one hour with adequate dispersion to keep all particles suspended. After one hour, powder was collected on a filter and dried in an oven. The resulting EMD was measured to have a carbon content of about 499 ppm due to benzoate. This value in consistent with what was predetermined from Example 2.

The EMD was then subjected to the 4-day corrosion test described in Example 6. After four days, the steel ball bearings were found to be free of any corrosion, again as expected from the predetermined benzoate concentration in Example 2.

Example 20

30 grams of milled, non-neutralized EMD was suspended in 150 milliliters of distilled water. 1N sodium hydroxide (NaOH) was added to the suspension until the pH (as measured with a commercially available combination electrode and pH meter) of 7 was reached. The liquid was filtered using a standard Buchner filter. When the last of the liquid was filtered, 29 grams of a 10 gram/liter sodium benzoate solution was added to the top of the filter to displacement-wash the wet cake, which was then dried. The resulting EMD was measured to have a carbon content of about 1460 ppm due to benzoate, which is consistent with a cake moisture of about 20%. The EMD was then subjected to the 4-day corrosion test described in Example 6. After four days, the steel ball bearings were found to be free of any corrosion.

Examples 19 and 20 demonstrate that the corrosion inhibitor, here sodium benzoate, can be incorporated within the EMD using different processes. Example 19 shows that the corrosion inhibitor can be incorporated within the EMD by suspending neutralized EMD in an aqueous solution including a specified amount of the corrosion inhibitor. Example 20 shows that residual neutralization liquid can be displaced by a corrosion-inhibitor solution, resulting (i.e., after filtering and drying) in an EMD including the corrosion inhibitor. The concentration of the corrosion-inhibitor wash solution predetermines the concentration of the corrosion inhibitor within the resulting EMD.

Example 21

0.31 grams of sodium benzoate was mixed with 18 grams of conventional, non-treated EMD. The resulting mixture was subjected to the 4-day corrosion test described in Example 6. After four days, the steel ball bearings were found to be free of any corrosion.

Example 21 shows that non-treated EMD can be mixed with the corrosion inhibitor. The resulting mixture can be used in a positive electrode in lieu of the conventional, non-treated EMD.

Moreover, the aforementioned examples, when taken in context with Comparative Example 1, demonstrate that each of these methods, in accordance with an embodiment of the invention, is effective at preparing an improved EMD including a corrosion inhibitor having a predetermined concentration within the improved EMD to reduce the corrosion of metal (in this case, steel), with which the improved EMD is in contact.

Example 22

EMD according to an embodiment of this invention was prepared with a predetermined concentration of sodium benzoate such that the carbon content as a result of benzoate incorporation was about 256 ppm. This EMD was used in the following can resistance test:

Use the following materials: AA can, 0.125"×2.25" nickel rod, EMD, 37% KOH solution, graphite (KS-44), a balance (±0.01 g), a disposable pipette, paraffin wax, a commercial LCR meter (QualTech 1710 LCR Digibridge), a carver press, a 0.5"×2.5" Teflon rod, a 0.5"×1.75" Teflon rod with a 0.125" bore hole down length, and #1 whatman filter paper cut in a 0.5" circle with a 0.125" hole located in the center, and an oven set to 50° C.

Mix 75 g of EMD powder, 6.52 g of graphite, and 15.4 g of 37% KOH solution. Place 7.5 g of the mixture in a AA can and press to 200 lbs pressure with the 2.5" Teflon rod using the carver press. Add 2.5 g of the mixture to the same AA can and repeat the process using a pressure of 200 lbs. Add 2.5 g of the mixture to the same AA can and insert the 1.75" Teflon rod. Insert the nickel rod into the 1.75" Teflon rod and tap with a hammer until the nickel rod is level with the top of the Teflon rod. Press the nickel-Teflon combined rod using the carver press at a pressure of 300 lbs. Carefully remove the Teflon rod leaving the nickel rod embedded in the EMD mixture. Place the #1 whatman filter paper over the nickel rod and gently press down on the EMD mixture. To complete the assembly, gently heat the paraffin wax until melted and pipette the melted wax on top of the whatman filter paper in a battery until paper is completely covered. Using the LCR meter, record the 1-kHz AC resistance reading between the nickel rod and the outside of the battery can. Store the assembly in the oven at 50° C. Remove the assembly from the oven and allow the assembly to cool to room temperature and then record the next resistance reading. Repeat the previous two steps for at least 20 days.

Figure 9:
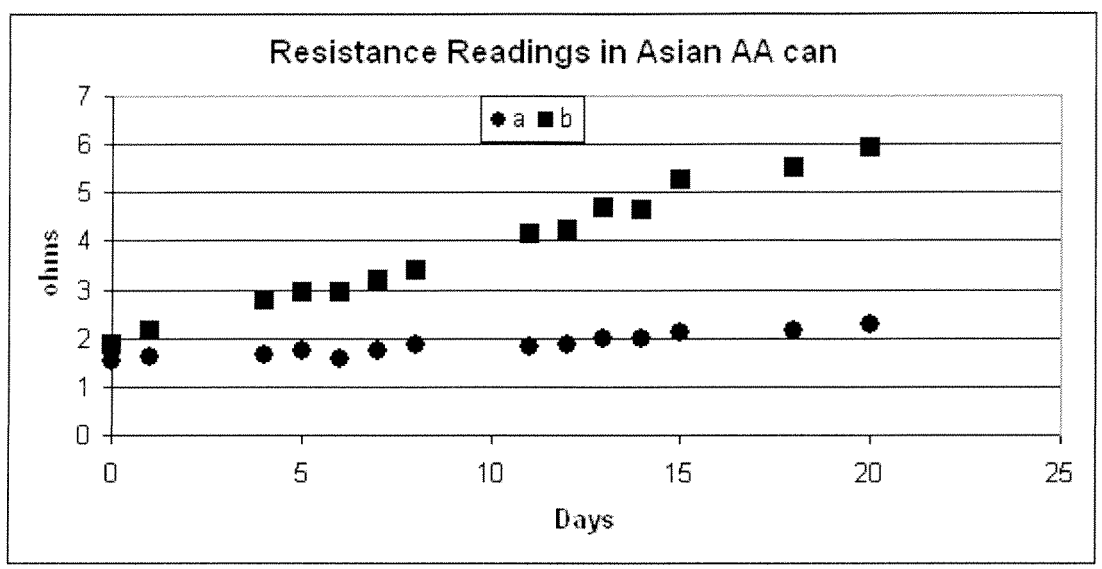
FIG. 9 shows a graph illustrating a comparison between (a) the resistance change within a battery can including the improved EMD, in accordance with an embodiment of the invention, and (b) the resistance change within a battery can including conventional EMD.

For the AA can, which was obtained from the Asian market, the resistance increased slightly from about 1.6 Ohms to about 2.2 Ohms (see FIG. 9(a)).

Comparative Example 3

EMD without any corrosion inhibitor was subjected to the same can resistance test described in Example 22 using the same type of can as described in Example 22. The resistance in this case increased from about the same starting point to about 6 Ohms (see FIG. 9(b)). A person of ordinary skill in the relevant art would understand that such a severe increase would lead to significant loss in battery performance.

The EMD according to an embodiment of this invention with a carbon content of more than about 200 ppm due to benzoate clearly leads to less resistance increase, which translates into improved battery performance.

One having ordinary skill in the art will readily understand that the invention as discussed above may be practiced with steps in a different order than those which are disclosed or with steps omitted. Therefore, although the invention has been described based upon these preferred and non-limiting embodiments, it would be apparent to those of skill in the relevant art that certain modifications, variations, and alternative constructions would be apparent, while remaining in the spirit and scope of the invention. Thus, the Example embodiments do not limit the invention to the particular listed devices and technologies. In order to determine the metes and bounds of the invention, therefore, reference should be made to the appended claims.

We claim:

1. An electrolytic manganese dioxide, comprising:
   a corrosion inhibitor within the electrolytic manganese dioxide after the electrolytic manganese dioxide is dried,
   wherein the corrosion inhibitor is configured to minimize corrosion of a metal material in contact with the electrolytic manganese dioxide, and
   wherein the corrosion inhibitor comprises benzoate configured to be at a concentration of greater than 295 parts per million and less than 14500 parts per million relative to the weight of the electrolytic manganese dioxide.

2. An electrolytic manganese dioxide, comprising:
   a corrosion inhibitor within the electrolytic manganese dioxide after the electrolytic manganese dioxide is dried,
   wherein the corrosion inhibitor is configured to minimize corrosion of a metal material in contact with the electrolytic manganese dioxide, and
   wherein the corrosion inhibitor comprises benzoate configured to be at a concentration resulting in a carbon content of greater than 200 parts per million and less than 10500 parts per million relative to the weight of the electrolytic manganese dioxide.

3. A primary battery, comprising:
   a negative electrode;
   an aqueous electrolyte;
   a positive electrode; and
   a metal current collector for the positive electrode in contact with the positive electrode,
   wherein the positive electrode comprises an electrolytic manganese dioxide comprising a corrosion inhibitor within the electrolytic manganese dioxide,
   wherein the corrosion inhibitor is configured to minimize corrosion of the metal current collector in contact with the positive electrode, and
   wherein the corrosion inhibitor comprises benzoate configured to be at a concentration of greater than 295 parts per million and less than 14500 parts per million relative to the weight of the electrolytic manganese dioxide.

4. A primary battery, comprising:
   a negative electrode;
   an aqueous electrolyte;
   a positive electrode; and
   a metal current collector for the positive electrode in contact with the positive electrode,
   wherein the positive electrode comprises an electrolytic manganese dioxide comprising a corrosion inhibitor within the electrolytic manganese dioxide,
   wherein the corrosion inhibitor is configured to minimize corrosion of the metal current collector in contact with the positive electrode, and
   wherein the benzoate is configured to be at a concentration resulting in a carbon content greater than 200 parts per million and less than 10500 parts per million relative to the weight of the electrolytic manganese dioxide.

5. The electrolytic manganese dioxide of claim 2, wherein the benzoate is configured to be at a concentration of greater than 610 parts per million relative to the weight of the electrolytic manganese dioxide.

6. The primary battery of claim 4, wherein the corrosion inhibitor comprises benzoate configured to be at a concentration of greater than 610 parts per million relative to the weight of the electrolytic manganese dioxide.

* * * * *